United States Patent [19]

Inoue et al.

[11] Patent Number: 4,815,548
[45] Date of Patent: Mar. 28, 1989

[54] COUNTERBALANCED WEIGHING APPARATUS

[75] Inventors: Shinichi Inoue, Kobe; Junichi Hayashi, Akashi, both of Japan

[73] Assignee: Yamato Scale Company, Limited, Japan

[21] Appl. No.: 160,527

[22] Filed: Feb. 26, 1988

[30] Foreign Application Priority Data

Feb. 27, 1987 [JP] Japan .................. 62-46492

[51] Int. Cl.$^4$ .................. G01G 23/06; G01G 3/08
[52] U.S. Cl. ................................. 177/187; 177/229
[58] Field of Search .................. 177/187–189, 177/229

[56] References Cited

U.S. PATENT DOCUMENTS

| | | | |
|---|---|---|---|
| 3,371,731 | 3/1968 | Connors et al. | 177/188 X |
| 4,580,645 | 4/1986 | Shoberg | 177/187 X |
| 4,593,778 | 6/1986 | Konishi et al. | 177/187 X |
| 4,724,914 | 2/1988 | Liang | 177/187 |

FOREIGN PATENT DOCUMENTS 57-200824  6/1981  Japan .

Primary Examiner—George H. Miller, Jr.
Attorney, Agent, or Firm—Senniger, Powers, Leavitt and Roedel

[57] ABSTRACT

The weighing apparatus according to the invention is for use on a support surface which is subject to vibration. The apparatus includes a base adapted to be positioned on the support surface and having opposing first and second sides. The base is adapted to transmit vibrations from the support surface. A tray holds the product to be weighed and has a center of gravity adjacent the first side of the base. A load cell supports the tray on the base at the first side of the base. Strain gauges connected to the load cell generate a signal indicative of the weight of the tray and any product held thereby. The signal includes oscillating noise corresponding to vibrations transmitted by the base through the load cell to the tray. An auxiliary beam and counterbalance weight stablize the tray by minimizing at least some of the vibrations transmitted to the tray and by converting at least some of the lower frequency vibrations transmitted to the tray into vibrations having a frequency which is higher than the frequency of the lower frequency vibrations. The tray transmits reverse-phase vibrations to the load cell which result in noise in the signal. The auxiliary beam and counterbalance converts at least some of the reverse-phase vibrations transmitted to the load cell into vibrations having a frequency which is higher than the frequency of the reverse-phase vibrations.

18 Claims, 2 Drawing Sheets

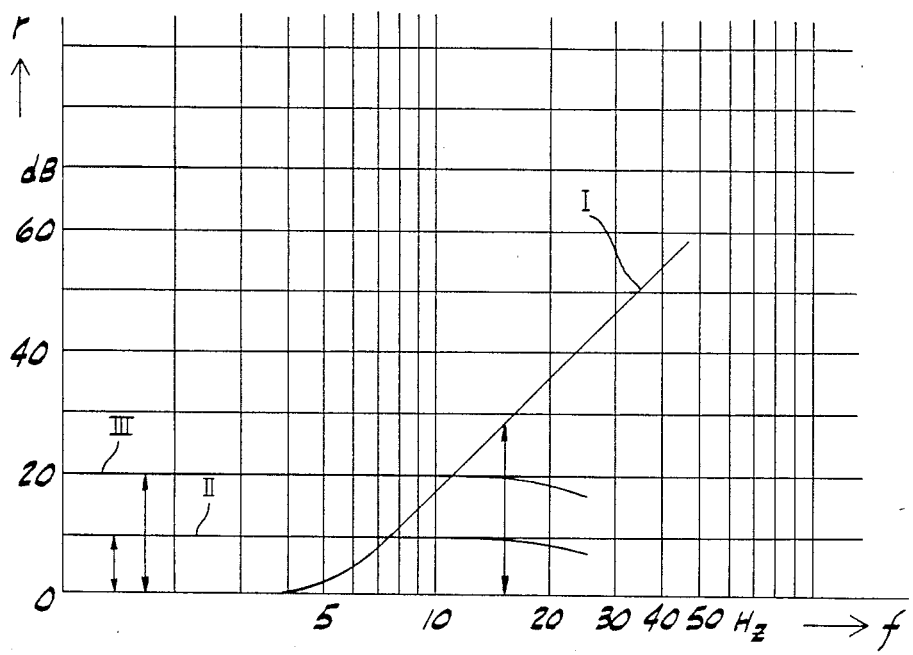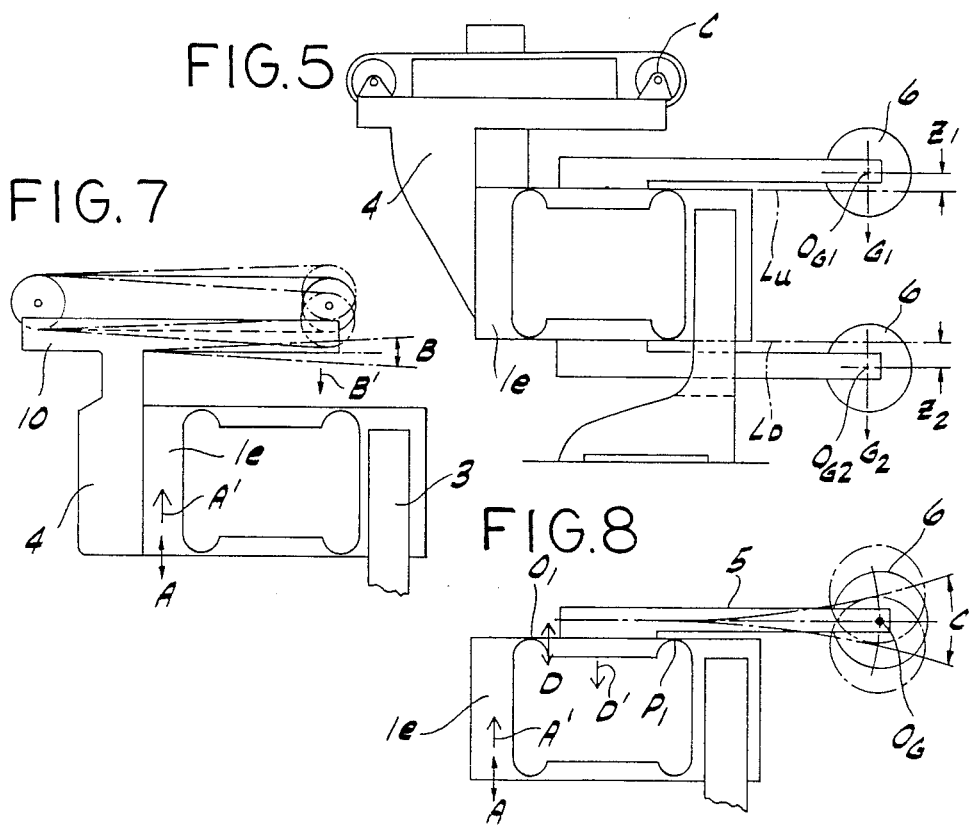

COUNTERBALANCED WEIGHING APPARATUS

FIELD OF THE INVENTION

This invention relates generally to apparatus for measuring weight (referred to herein as a "weighing apparatus"), and, in particular, a counterbalanced weighing apparatus which is substantially unaffected by vibration of its support surface or by reverse-phase vibrations generated by the vibration of part of the apparatus.

BACKGROUND OF THE INVENTION

Existing compact weighing apparatus generally use so-called parallelogram type load cells, in which, as shown in FIG. 1, the strain gauges 1B are mounted on the elastic flexible fulcrum portions 1c of a parallelogram mechanism 1A. The external configuration of mechanism 1A is in the shape of a parallelogram having equal-length upper and lower beams 1a and 1b, and equal-length right and left vertical members 1d and 1e which connect the upper and lower beams at a prescribed interval via portions 1c provided at both ends of each of the upper and lower beams.

In order to perform accurate weight measurement using a load cell system or other high-precision weighing apparatus, the support surface on which the weighing apparatus is installed should be stable and stationary so that it does not impart vibrations to the load cell or reflect vibrations caused by the weighing apparatus.

Nevertheless, with the exception of some special locations, the installation surfaces used to support such weighing apparatus generally vibrate as the result of vibration caused by vehicles passing nearby, factory machinery, etc. As a result when a weighing apparatus is installed on an unstable support surface subject to vibration and the material to be weighed is loaded onto the loading tray (pan, table, platform, etc.) of the weighing apparatus, the weight signal of the weighing apparatus is adversely affected by the vibration transmitted from the support surface.

Also, for a weighing apparatus in which load cells are used, the vibration from the support surface of the apparatus or the vibration of a part of the apparatus is transmitted to and through the weighing apparatus, and this mechanical vibration is converted into an electrical signal appearing as electrical noise. Because this noise consists mostly of relatively low-frequency (frequencies of approximately 7 Hz or less) components, it is difficult to eliminate. Even if mechanical dampers are used and an active filter or other device is installed in series with the signal amplifier, the present state of the art has difficulty in finding a way to deal with this noise problem. The larger the mass of the tare, such as the loading tray, the more the weight measurement is affected and the more severe the problem becomes.

Lowering of the effective frequency range at which filtering may be performed by a low-pass filter can generally be considered as an effective means of dealing with the problem. However, low pass filtering results in a delay of the weight signal, thus reducing the responsiveness of the weighing apparatus. This reduction in responsiveness is in direct oppostion to achieving an increase in the weight measurement speed, which is one of the objectives in improving today's weighing apparatus.

SUMMARY OF THE INVENTION

In consideration of the problem explained above, an object of this invention is to provide a parallelogram type load cell weighing apparatus which is capable of eliminating the low-frequency noise transmitted from the support surface or the high frequency noise caused by reverse-phase vibrations with little loss in the responsiveness of the weighing apparatus.

It is another object of this invention to provide a modified weighing apparatus which is not adversely affected by vibration suppression of its support surface and having vibration features which can be added to existing weighing apparatus without incurring any major expense.

It is an object of this invention to provide a weighing apparatus which, even if installed on a support surface which is subject to vibration, is capable of performing accurate weight measurements without being affected by the low-frequency noise transmitted from or reflected by the support surface and without experiencing a drop in responsiveness such as when using only a low-pass filter having a lowered frequency range at which filtering is performed.

It is an object of this invention to provide weighing apparatus which is relatively simple structurally.

It is yet another object of this invention to provide vibration compensating features which can be used together with an active filter in a weighing apparatus to minimize signal noise across a wide range from low frequencies to high frequencies.

Other objects and features will be in part apparent and in part pointed out hereinafter.

The weighing apparatus according to the invention is for use on a support surface which is subject to vibration. The apparatus includes a base adapted to be positioned on the support surface and having opposing first and second sides. The base is adapted to transmit vibrations from the support surface. First means holds the product to be weighed and has a center of gravity adjacent the first side of the base. A load cell rigidly supports the first means on the base at the first side of the base so that there may appear local vibration in the support of the first means at a resonant frequency sufficiently higher than the primary resonant frequency of the vibration of the scale. Signal-generating means connected to the load cell generates a signal indicative of the weight of the first means an any product contained therein. The signal includes oscillating noise corresponding to vibrations of the load cell transmitted to the first means. Second means stablizes the first means by minimizing at least some of the vibrations of the first means. The second means may comprise means for counterbalancing the first means and the load receiving part of the load cell and having a center of gravity adjacent the second side of the base whereby the base is located between the center of gravity of the first means and the load receiving part and the center of gravity of the second means. The second means may comprise an auxiliary beam extending from the load cell to beyond the second side of the base. The auxiliary beam has a first end connected to the load cell and has a second end supporting a balancing weight adjacent the second side of the base.

BRIEF DESCRIPTION OF THE DRAWING

FIGS. 4 and 5 are side views of weighing apparatus showing other preferred embodiments of the invention.

FIG. 6 is a line graph showing the reduction effectiveness of the weighing apparatus of the embodiment shown in FIG. 1.

FIGS. 7 and 8 are partial side views of weighing apparatus showing the reverse-phase vibration.

Corresponding reference characters indicate corresponding parts throughout the several views of the drawings.

DETAILED DESCRIPTION OF THE PREFERRED EMBODIMENTS

Figure 2:
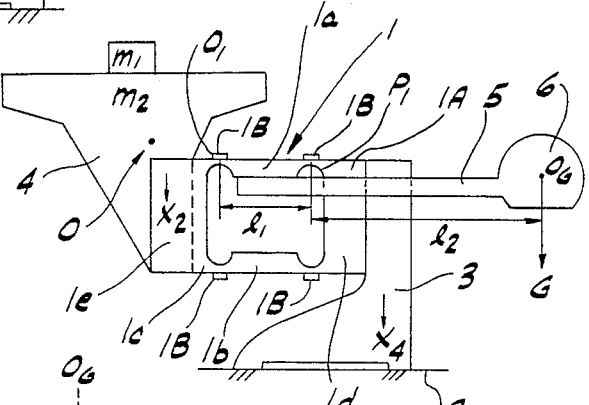
FIG. 2 is a side view showing the construction of the weighing apparatus of one embodiment of the present invention.
Figure 3:
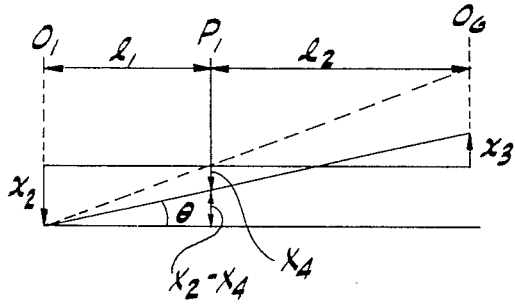
FIG. 3 is a geometric diagram showing the positional relationship of the fulcrum, force, and force application points, and the positional relationship of the displacement in the vertical direction of the parts of the weighing apparatus shown in FIG. 2.

FIG. 2 is a side view showing the construction of the weighing apparatus of one preferred embodiment of the present invention. FIG. 3 is a relational diagram showing the positional relationship of the fulcrum points, the force points, and their points of application, and the positional relationship of the displacement in the vertical direction of the weighing apparatus shown in FIG. 2.

In FIG. 2, a parallelogram type load cell unit 1 is composed of a parallelogram mechanism 1A on which strain gauges 1B are affixed. The strain gauges 1B constitute means connected to the load cell 1 for generating a signal indicative of the weight of the member 1e, the loading tray 4 (mass $m_2$) and any product to be weighed contained therein (mass $m_1$). The signal may include oscillating noise corresponding to vibrations transmitted by a base or frame 3 through the load cell 1 to the tray 4. The parallelogram mechanism 1A is comprised substantially of equal-length upper and lower substantially horizontal, substantially parallel beams 1a and 1b, and of substantially equal length right and left substantially vertical, substantially parallel members 1d and 1e which interconnect these upper and lower beams via elastic flexible fulcrum portions 1c provided at both ends of the beams.

In this embodiment, the right vertical member 1d is rigidly affixed to or formed integrally with the base 3 of the weighing apparatus. Tray 4 constitute first means for holding the product to be weighed. The tray 4 and member 1e comprise the load receiving side of the weighing apparatus and have a center of gravity O adjacent the first side (the left side as veiwed in FIG. 2) of base 3. The load cell 1 supports the tray 4 on the base 3 at the left side of the base. In addition, the left vertical member 1e is rigidly affixed to or formed integrally with loading tray (tare) 4 of the weighing apparatus. Because the base 3, parallelogram mechanism 1A and the loading tray 4 are rigidly connected vibrations from the support surface S, on which the base is mounted will be transmitted through the base of the weighing apparatus. In such construction, even if a vibration of the load receiving side or a reverse-phase vibration of a part of the load receiving side (explained below) occurs, it has a high frequency, and the noise resonant signal generated by this high frequency can be quickly and substantially attenuated to eliminate its effects by normal low pass filtering.

One end of an auxiliary beam 5 is fixed to the underside of either beam 1a or 1b between the fulcrum portions 1c on the first side (the left side) of frame 3. In FIG. 2, beam 5 is shown affixed to beam 1a. The other end of this auxiliary beam 5 extends laterally outwardly beyond the base 3, and terminates in an integrally formed counterweight balancer 6 on the opposing second side (the right side) of base 3. This balancer 6 possesses a mass which generates a clockwise moment on the parallelogram mechanism 1A having a value equivalent (in this embodiment a value which is exactly equal) to the counterclockwise moment due to the mass of the load receiving side which acts upon the parallelogram mechanism 1A (i.e. $(m_1+m_2)l_1 = Gl_2$). The beam 5 is substantially rigid so that the frequency at which a reverse-phase local vibration is generated by the bending of beam 5 is rather high.

Thus, with respect to vertical vibration from the support surface S, the balancer 6 of the auxiliary beam 5 generates a vibrational mass force on mechanism 1A which substantially cancels the moment of the vibrational mass force caused by vibration from the support surface S. As a result, this apparatus according to the invention as illustrated in FIG. 2, is virtually unaffected by low-frequency vertical vibration from the support surface S. The balancer 6 and beam 5 constitute means for stabilizing the tray 4 by minimizing at least some of the vibrations transmitted by base 3 to the tray 4. The balancer 6 and beam 5 counterbalance the tray 4 and member 1e because the center of gravity of beam 5 and balancer 6 $O_G$ is adjacent the second side (the right side) of frame 3 so that the center of gravity C of tray 4 and member 1e and the center of gravity $O_G$ of the balancer 6 and beam 5 are located on opposite sides of the base 3.

The following is a mathematical analysis explaining the operational effectiveness of the weighing apparatus of the preferred embodiment of the invention illustrated in FIG. 2 when subjected to vertical vibration of the support surface S.

Now, for this weighing apparatus shown in FIG. 2, if $m_1$ is the mass of the material being weighed, $m_2$ the mass of the loading tray 4 and member 1e, M the sum of these masses, i.e., $M = m_1 + m_2$, and G the mass of the beam 5 and balancer 6; and if, as shown in FIG. 3, the vertical displacement of the vibration of the mass of the load-receiving member 1e is $X_2$, the vertical displacement of the vibration at the center of gravity $O_G$ of the balancer is $X_3$, the vertical displacement of the vibration of the base 3 is $X_4$, the distance from the outer elastic fulcrum $O_1$ to the inner elastic fulcrum $P_1$ is $l_1$, and the distance from this fulcrum $P_1$ to the center of gravity $O_G$ of the balancer 6 is $l_2$, then the equation of motion of this system can generally be expressed as the following Equation (1), where g is the gravitational acceleration and $K_2$ is the spring constant of the parallelogram mechanism.

$$Ml_1(g+\ddot{X}_2) - Gl_2(g+\ddot{X}_3) + K_2(X_2-X_4) = 0 \ldots \quad (1)$$

Now, if the construction of the weighing apparatus is made sufficiently rigid to avoid bending deformation, so that the positional relationships of $X_2$, $X_3$, $X_4$, and $l_1$ and $l_2$ remain as shown in FIG. 3, it is possible to obtain the following Equation (2), by summing the moments at equilibrium:

$$X_3 + -X_2\frac{l_2}{l_1} + X_4\left(1 + \frac{l_2}{l_1}\right) \quad (2)$$

Now, by differentiating the above Equation (2) twice, it can be rewritten as the following Equation (3):

$$\ddot{X}_3 = -\ddot{X}_2\frac{l_2}{l_1} + \ddot{X}_4\left(1 + \frac{l_2}{l_1}\right) \quad (3)$$

By substituting this Equation (3) into Equation (1) above, the following Equation (4) can be obtained.

$$g(Ml_1 - Gl_2) + \left(Ml_1 + Gl_2\frac{l_2}{l_1}\right)\ddot{X}_2 - Gl_2\left(1 + \frac{l_2}{l_1}\right)\ddot{X}_4 + K_2(X_2 - X_4) = 0 \quad (4)$$

Here, as explained above, because G is selected such that $Ml_1=Gl_2$, Equation (4) can be rewritten as the following Equation (5) and further as Equation (6) and then as Equation (7).

$$Ml_1\ddot{X}_2\left(1 + \frac{l_2}{l_1}\right) - Ml_1\ddot{X}_4\left(1 + \frac{l_2}{l_1}\right) + (K_2(X_2 - \ddot{X}_4) = 0 \quad (5)$$

$$Ml_1\left(1 + \frac{l_2}{l_1}\right)(\ddot{X}_2 - \ddot{X}_4) + K_2(X_2 - X_4) = 0 \quad (6)$$

$$\left(Ml_1 + Gl_2\frac{l_2}{l_1}\right)(\ddot{X}_2 - \ddot{X}_4) + K_2(X_2 - X_4) = 0 \quad (7)$$

Furthermore, if the angle of the axis of the beams 1a, 1b, and 5 with respect to the origin, or horizontal axis is $\theta$ (where $\theta \neq 0$ and $\tan\theta \neq 0$), $$X_2 - X_4 = l_1\theta \ldots \quad (8)$$

And, by differentiating both sides of Equation (8) twice, it is possible to obtain the following Equation (9).

$$\ddot{X}_2 - \ddot{X}_4 = l_1\ddot{\theta} \ldots \quad (9)$$

By substituting this Equation (9) into Equation (7), the following Equation (10) can be obtained.

$$(Ml_1^2 + Gl_2^2)\ddot{\theta} + K_2 l_1\theta = 0 \ldots \quad (10)$$

The $(Ml_1^2 + Gl_2^2)$ term in this Equation (10) is the moment of inertia. Also, the $X_4$-related term is canceled out, and Equation (10) is the equation of the expression for free vibration as a function of only $\theta$. In other words, this Equation (10) is similar to the equation for when the weighing apparatus is installed on a stable, stationary support surface S. In addition, from this equation, it can be seen that, when the moment of the balancer 6 (including auxiliary beam 5) acting upon the parallelogram mechanism 1A and the moment of the loading tray 4 (including member 1e) acting upon the mechanism 1A are equal, operation of the weighing apparatus is not influenced by vertical vibration of the base 3 imparted by support surface S. This is because the moment of mass force generated by the loading tray 4 and the material being weighed ($m_1$) when the support surface S of the weighing apparatus is vertically vibrating is cancelled by the moment of mass force generated by the balancer 6.

The following is an explanation in reference to FIG. 6 of the operational effectiveness of the embodiment shown in FIG. 2. In FIG. 6, the attenuated reduction value r (dB) is plotted on the ordinate and the frequency f is plotted on the abscissa. Line I showns the reduction effectiveness in decibels of the vibration output of a weighing apparatus using only an active filter. Lines II and III show the reduction effectiveness in decibels of the vibrational output of the weighing apparatus according to the invention when $m_2/m_1 = 2$ and $m_2/m_1 = 9$, respectively. In other words, for the case of the active filter indicated by Line I, although considerable reduction effectiveness is obtained for the high-frequency range, the reduction effectiveness is drastically reduced at a frequency of 7 Hz or lower. As can be seen in the graph, the reduction effectiveness disappears at approximately 5 Hz or lower.

Figure 1:
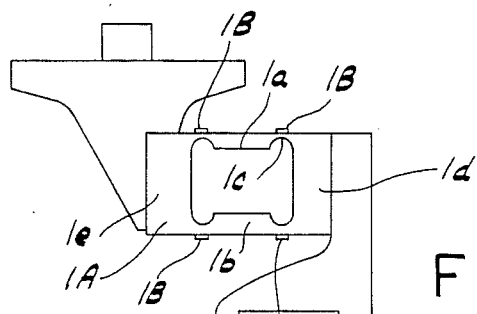
FIG. 1 is a side view showing the construction of a parallelogram load cell type weighing apparatus in accordance with the prior art.

In contrast, for a weighing apparatus according to the invention, it can be seen that considerable reduction effectiveness is obtained in the low-frequency range, including ultra-low frequencies (theoretically from a frequency of 0). Note that, in the case of a weighing apparatus having a configuration in accordance with the prior art as shown in FIG. 1, the reduction ratio for ultra-low frequencies is 0 (on the horizontal line of the graph in FIG. 6). The balancer according to the invention balances the mass of the loading tray which does not include the mass of the material being weighed. Therefore, as illustrated by a comparision of Line II and Line III, the smaller the mass of the material being weighed in comparison to the tare weight, the greater the reduction effectiveness.

Thus, for an actual weighing apparatus, by using both an active filter and this invention, harmful vibrations across a wide range from high frequencies to low frequencies can be effectively reduced to a level at which they present no hindrance in practical use.

Figure 4:
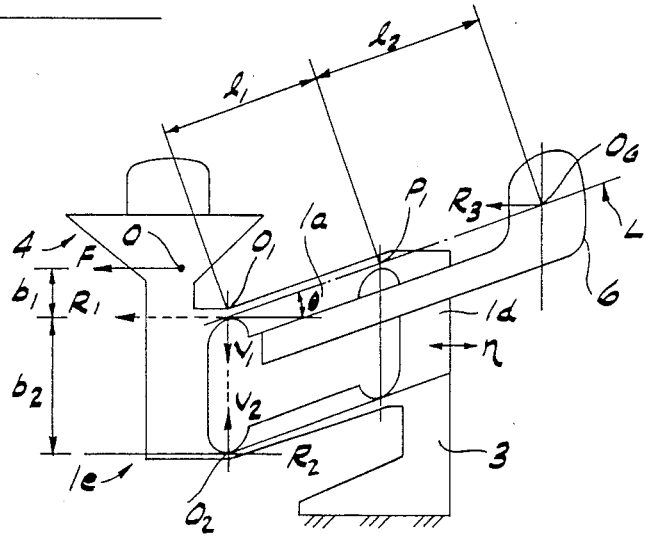

In addition to the preferred embodiment explained above, a similar effect can be obtained with respect to the horizontal vibration of the support surface S by using the weighing apparatus according to the preferred embodiment such as that shown in FIG. 4. In particular, the position of the center of gravity $O_G$ of the balancer 6 is located substantially on a line L extending through the two elastic fulcrums $O_1$ and $P_1$ of the upper beam 1a of the parallelogram type load cell 1A. As indicated below, this will reduce vibrations superimposed or transmitted on the load cell 1 by horizontal vibration components transmitted from the support surface S through the base 3 to the load cell 1.

Similar to the preceding explanation, the following is a mathematical analysis explaining the operational effectiveness of the weighing apparatus of the preferred embodiment of the invention illustrated in FIG. 4 when subjected to horizontal vibration of the support surface S.

The weighing apparatus as shown in FIG. 4 is equipped with a parallelogram mechanism 1A balanced by a balancer 6. The center of gravity $O_G$ of this balancer 6 is positioned on a line extending from the two elastic fulcrums $O_1$ and $P_1$ of the upper beam of this parallelogram mechanism 1A. If only the horizontal vibration $n = n_o \sin w_o t$ acts upon the load-receiving part of the weighing apparatus, each horizontal vibrational mass force (inertial force) acts upon the center of gravity O of the load-receiving side of the weighing apparatus and upon the center of gravity $O_G$ of the balancer 6 (including beam 5). "Load-receiving side" as used herein in regard to FIG. 4 means the portions of the weighing apparatus to the left of fulcrum $O_1$ and $O_2$.

Here, if F is the horizontal force acting upon the center of gravity O of the load-receiving side of the weighing apparatus and $R_3$ is the horizontal force acting upon the center of gravity $O_G$ of the balancer 6, the forces $R_1$ and $R_2$ acting upon the upper and lower elastic fulcrum points $O_1$ and $O_2$ of the parallelogram mechanism 1A of the load-receiving side can be expressed by the following Equations (11) and (12).

$$R_1 = F\left(\frac{b_1 + b_2}{b_2}\right) \quad (11)$$

$$R_2 = F\left(\frac{b_1}{b_2}\right) \quad (12)$$

This horizonatal force F which acts upon the center of gravity O of the load-receiving side of the weighing apparatus can be regarded as the sum of the forces $R_1$ and $R_2$ acting upon the upper and lower elastic fulcrums $O_1$ and $O_2$ of the parallelogram mechanism.

Let us assume that the counterclockwise moment is positive. There are two moments acting on the upper beam: the moment of $R_1$ with respect to the elastic fulcrum $P_1$; and the moment of $R_3$ acting upon the center of gravity $O_G$ of the balancer. Thus, the total moment M around this elastic fulcrum $P_1$, i.e. M(at $P_1$), can be expressed as the following Equation (13).

$$M(\text{at } P_1) = -R_1(l_1 \sin\theta) + R_3(l_2 \sin\theta) \ldots \quad (3)$$

The vertical force $V_1$ at point )1 which this moment M(at $P_1$) exerts on the load-receiving part of the weighing apparatus can be expressed as the following Equation (14).

$$V_1 = -R_1 \tan\theta + R_3 \frac{l_2}{l_1} \tan\theta \quad (14)$$

In addition, the vertical force $V_2$ at point $O_2$ resulting from the force of the lower beam acting on the load receiving side can be expressed as the following Equation (15).

$$V_2 = R_2 \tan\theta \ldots \quad (15)$$

Thus, the sum of the vertical forces acting upon the load-receiving part can be expressed as the following Equation (16).

$$V_1 + V_2 = \left(-R_1 + R_2 + R_3 \frac{l_2}{l_1}\right)\tan\theta \quad (16)$$

Here, because $R_1 - R_2 = F$, the above Equation (16) can be expressed as the following Equation (17).

$$V_1 + V_2 = \left(-F + R_3 \frac{l_2}{l_1}\right)\tan\theta \quad (17)$$

Furthermore, because $F = -w^2 nM$, $R_3 = -w_o{}^2 nG$, $n = n_o \sin w_o t$, and $Ml_1 = Gl_2$, the term in parentheses on the right side of Equation (17) becomes zero, and, as a result, $V_1 + V_2 = 0$. Therefore, concerning the horizontal force F generated by horizontal vibration of the load-receiving side, even if the center of gravity O of the load-receiving side drops (deflects) in the vertical direction, the weighing apparatus according to the embodiment shown in FIG. 4 substantially eliminates vibration in the horizontal direction. This is because the sum of the vertical components of the reaction force which the beams exert on the load receiving part is zero, i.e., $V_1 + V_2 = 0$.

The weighing apparatus of the preferred embodiment described above and illustrated in FIG. 4 is capable of performing weight measurements substantially unaffected by either vertical or horizontal vibration from the support surface S. Horizontal vibration may actually result in a considerable amount of rolling from side to side of the base. The weighing apparatus of the invention is also capable of handling this type of vibration.

In the embodiments described above the balancer 6 is designed to be in balance with the moment generated by the weight of the load-receiving side. However, it has been confirmed in experiments conducted by the inventors that, even if the balancer 6 is not in perfect balance, as long as it approximately balances the moment, the low-frequency vibration is sufficiently removed so that there are no substantial adverse effects in actual weight measurements.

In the embodiment described above the balancer 6 is mounted on the weighing appartus via the auxiliary beam 5 extending from the underside of the beam 1a. As shown in FIG. 5, it is also possible to mount a balancer on an auxiliary beam on each of the upper and lower beams 1a and 1b. The auxiliary beams may be mounted to the top sides or the bottom sides of the upper and lower horizontal beams. When a balancer is provided on each of the upper and lower beams as shown in FIG. 5, $G_1 \times Z_1$ is the moment with respect to the upper fulcrum line $L_U$ for the upper balancer and $G_2 \times Z_2$ is the moment with respect to the lower fulcrum line $L_D$ for the lower balancer. Assume that $Z_1$ and $Z_2$ are positive values for the upward direction and that the total moment due to the horizontal vibrational mass forces caused by the masses of the balancers is zero. Then, as shown in the following Equation (18), it is possible to completely compensate for the horizontal vibration just as in the solution where the center of gravity $O_G$ of the balancer 6 is positioned on the line through $O_1 - P_1$ (the embodiment shown in FIG. 4).

$$G_1 \times Z_1 + G_2 \times Z_2 = 0 \ldots \quad (18)$$

It is also contemplated that a hopper, a small conveyor C (see FIG. 5) or other part having a large tare mass may be mounted on the load-receiving part 1e of the weighing apparatus (i.e., on the load tray 4 as shown in FIG. 5). This large tare mass increases vibration reduction effectiveness as noted above with regard to FIG. 6. In general, if the structure which supports a large tare mass on a load-receiving part is not rigidly attached to the load-receiving part, the apparatus will have two resonant points instead of one natural vibration frequency frequently referred to as a primary resonant frequency (see, for example, co-assigned application Ser. No. 028,721 filed Mar. 23, 1987, incorporated herein by reference). The first resonance point will have a frequency slightly lower than the primary resonant frequency and the second resonance point will have a frequency higher than the primary resonant frequency.

For example, the support structure which supports the tare mass on the load-receiving part 1e may be bolts (not shown) which fasten the tare mass to the load-receiving part 1e Such bolts may have a relatively low rigidity and produce the first and second resonance points noted above. On the other hand, if the support structure is such that the tare is integral with the part 1e, as shown in FIG. 4, such integral structure would have a relatively high rigidity and would have a first resonant frequency in a frequency range near the primary resonant frequency and a second resonant frequency in a frequency range much higher than the primary resonant frequency. Specifically, vibrations excited in the second resonance frequency range will appear as reverse-phase vibration. Reverse-phase vibration is defined herein as vibration which is in opposite phase to the vibration of the load-receiving part 1e of the weighing apparatus.

By increasing the resonant frequency of the reverse-phase oscillations, the signal generated by the strain gauges due to strain on the load cell will include noise at the resonant frequency of the reverse-phase oscillations. However, such noise can be eliminated or substantially reduced by using an active low-pass filter or some other means.

In addition, it is preferable that the auxiliary beam 6 be substantially rigid or stiff so that any reverse-phase vibrations are substantially higher than the primary resonant frequency and easily reduced or eliminated by filtering. In particular, it is preferable that the beam be stiff to the extent that there is no bending resonance in the beam (and balancing weight) at least in a frequency range at or near the primary resonant frequency. In the case of the active filter having the characteristic curve of line I in FIG. 6, for example, this invention has another advantage in that the higher the resonant frequency of a reverse-phase local vibration, the larger the attenuation rate of the filter. Consequently, the heavy noise signal generated by resonance can be substantially, completely attenuated. Even if the local vibration is removed in this way, no substantial delay in responsiveness will result.

Thus, in one preferred embodiment of the weighing apparatus according to the invention, the tray 4 is rigidly mounted to the left vertical member 1e of parallelogram-type load cell 1A so that there is little or no flexion between the tray and member resulting in the frequency of the reverse-phase vibration of the tray being higher than the low frequency noise to be filtered (i.e. reduced or canceled). If the tray and member are not rigidly connected, local oscillations as shown in FIG. 7 may occur. Because the weighing apparatus, in general, has characteristics similar to the characteristics of a spring-mass system, the auxiliary beam is preferably rigidly constructed so that the frequency of its bending vibrations is higher than the primary resonant frequency, extends laterally outwardly from the side of the base 3 opposite the load-receiving side. The auxiliary beam may extend from either the upper beam or the lower beam or from both beams which comprise the parallelogram type load cell. The balancer may be formed integral with the auxiliary beam(s). The vibration from the support surface S is transmitted through the base 3 of the weighing apparatus. The vibrational mass force of the load receiving part 1e has the same phase as the vibration due to the vibrational mass force generated by the mass of the balancer 6 on the auxiliary beam 5 in the low frequency range. Thus, the moments of the two vibrational mass forces substantially cancel each other out. As a result, the oscillating output which is caused by vibration from the support surface and which is imposed onto the output signal of the load cell is either greatly reduced or eliminated.

As various changes could be made in the above constructions without departing from the scope of the invention, it is intended that all matter contained in the above description or shown in the accompanying drawings shall be interpreted as illustrative and not in a limiting sense.

In view of the above, it will be seen that the several objects of the invention are achieved and other advantageous results attained.

What is claimed is:

1. Weighing apparatus having a primary resonant frequency and adapted for use on a support surface which is subject to vibration, said apparatus comprising:
   a base adapted to be positioned on the support surface and having opposing first and second sides, said base being adapted to transmit vibrations from the support surface;
   first means for holding product to be weighed and having a center of gravity adjacent the first side of the base;
   a load cell having a load-receiving part attached to and supporting said first means on the base at the first side of the base so that at least some of the local vibrations in the load-receiving part of the first means appear at a resonant frequency higher than the primary resonant frequency;
   signal generating means connected to the load cell for generating a signal indicative of the weight of said first means and any product held thereby, said signal including oscillating noise corresponding to vibrations transmitted by the base through the load cell to said first means; and
   second means for stablizing said first means by minimizing at least some of the vibrations of the first means and including means for counterbalancing said first means and said load-receiving part, said means for counter-balancing having a center of gravity adjacent the second side of the base whereby the base is located between the center of gravity of said first means and the center of gravity of the second means.

2. The weighing apparatus of claim 1 wherein said second means comprising an auxiliary beam extending from the load cell to beyond the second side of the base,
   said auxiliary beam having a first end connected to the load cell and a second end supporting a balancing weight adjacent the second side of the base,
   said auxiliary beams being substantially rigid so that at least some of its vibrations in the beam appear at a resonant frequency higher than a primary resonant frequency of the weighing apparatus,
   said local vibrations being in reverse phase to the vibration of the load receiving part.

3. The apparatus of claim 2 wherein the moment of the auxiliary beam and balancing weight substantially balances the moment resulting from the weight of said first means and said load-receiving part thereby to reduce vibrations imposed on the load cell by vertical vibration components transmitted from the support surface through the base to the load cell.

4. The apparatus of claim 1 wherein said load cell comprises a parallelogram structure having first and second substantially parallel, substantially vertical, substantially equal length members interconnecting upper and lower substantially parallel, substantially horizontal, substantially equal length beams, each of said upper and lower beams having two elastic fulcrums to permit elastic flexure of beam relative to said first and second members, and wherein said first member engages the base and said second member constitutes said load-receiving part and engages said first means.

5. The apparatus of claim 4 wherein said first end of the auxiliary beam is connected to a selected one of the beams of said parallelgram structure.

6. The apparatus of claim 5 wherein the center of gravity of said balancing weight and said auxiliary beam is located substantially on a line extending through said fulcrums of said selected beam thereby to reduce vibrations imposed on the load cell by horizontal vibration components transmitted from the support surface through the base to the load cell.

7. The apparatus of claim 4 wherein said signal-generating means comprises strain gauges for measuring the strain forces exerted on said first and second members.

8. The apparatus of claim 7 wherein said strain gauges are located at said fulcrums to measure the strain imparted thereto, said the first end of the auxiliary beam being connected between the fulcrums of said selected beam.

9. The apparatus of claim 4 wherein said second means comprises upper and lower auxiliary beams extending from said load cell laterally outwardly beyond said second side of the base, said upper auxiliary beam having a first end connected to upper beam of the load cell and a second end supporting a first balancing weight adjacent the second side of the base, and said lower auxiliary beam having a first end connected to the lower beam of the load cell and a second end supporting a second balancing weight adjacent the second side of the base.

10. The apparatus of claim 9 wherein the moment of the auxiliary beams and balancing weights substantially balance the moment resulting from the weight of said first means and said load-receiving part thereby to reduce the vibrations imposed on the load cell by vertical vibration components transmitted from the support surface through the base to the load cell.

11. The apparatus of claim 9 wherein signal-generating means comprises strain gauges for measuring the strain forces exerted on said first and second members.

12. The apparatus of claim 11 wherein each of said upper and lower beams has two elastic fulcrums, said strain gauges being located at said fulcrums to measure the strain imparted thereto by the weight of said first means and any product held thereby, the first end of the auxiliary beams being connected between the fulcrums of respective beams.

13. The apparatus of claim 1 wherein said second means comprises an auxiliary beam extending from the load cell laterally outwardly beyond said second side of the base, said auxiliary beam having a first end connected to the load cell and a second end supporting a balancing weight adjacent the second side of the base.

14. The apparatus of claim 13 wherein the moment of said auxiliary beam and balancing weight substantially balances the moment resulting from the weight of said first means and said load-receiving part thereby to reduce vibrations imposed on the load cell by vertical vibration components transmitted from the support surface through the base to the load cell.

15. The apparatus of claim 13 wherein said load cell comprises a parallelogram structure having first and second substantially parallel, substantially vertical, substantially equal length members interconnecting upper and lower substantially parallel, substantially horizontal, substantailly equal length beams, each of said upper and lower beams having two elastic fulcrums to permit elastic flexure of the beam relative to said first and second members, and wherein said first member engages the base and said second member engages said first means.

16. The apparatus of claim 15 wherein said signal-generating means comprises strain gauges for measuring the strain forces exerted on said first and second members, said strain gauges being located at said fulcrums to measure the strain imparted thereto, said first end of the auxiliary beams being connected between the fulcrums of the respective beams.

17. The apparatus of claim 15 wherein said first end of the auxiliary beam is connected to a selected one of the beams of said parallelogram structure.

18. The apparatus of claim 17 wherein the center of gravity of said balancing weight and said auxiliary beam is located substantially on a line extending through said fulcrums of said one of said selected beam thereby to reduce the vibrations imposed on the load cell by horizontal vibration components transmitted from the support surface through the base to the load cell.

* * * * *